D. M. READ.
Pocket-Books.

No. 153,016.

Patented July 14, 1874.

UNITED STATES PATENT OFFICE.

DANIEL M. READ, OF NEW YORK, N. Y.

IMPROVEMENT IN POCKET-BOOKS.

Specification forming part of Letters Patent No. 153,016, dated July 14, 1874; application filed June 13, 1874.

*To all whom it may concern:*

Figure 1:
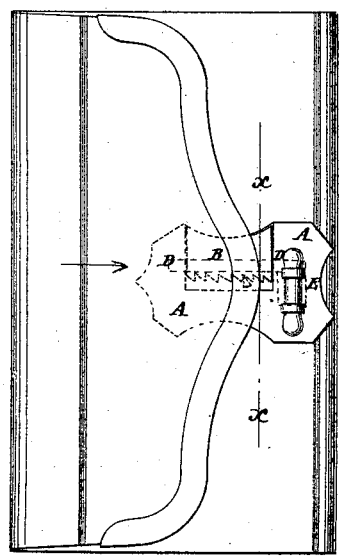
Figure 2:
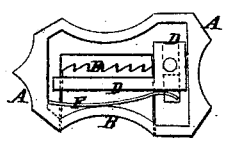
Figure 3:

Be it known that I, DANIEL M. READ, of the city, county, and State of New York, have invented a new and useful Improvement in Pocket-Books, of which the following is a specification:

Figure 1 is a front view of my improved fastening. Fig. 2 is a detail view of the inner side of the same; and Fig. 3 is a detail cross-section of the same taken through the line $x\ x$, Fig. 1.

Similar letters of reference indicate corresponding parts.

My invention has for its object to furnish an improved fastening for pocket-books, &c., which shall be simple in construction and convenient in use, and which will allow the catch to be slipped forward to draw the flap snugly upon the body of the book, and will hold it securely in place.

The invention consists in an improved fastening for pocket-books, &c., in which a part of the main plate is movable, has teeth formed upon its inner edge, and is provided with a bar or arm, a knob, and a spring, as hereinafter fully described.

A is the main plate of the fastening, which is made with a flange around the edge of its under side to form a recess to receive the spring and the bar against which it rests. The plate A is slotted longitudinally to receive the catch. One side of the plate A, except the flange, is cut away and replaced by a plate, B, which has ratchet-teeth formed upon its inner edge to take hold of the catch attached to the flap of the pocket-book. The sliding plate B has an arm, D, attached to its inner side, the ends of which overlap the under side of the plate A to keep the said plate B in place. E is the knob, by means of which the sliding plate B is moved back to unfasten the catch, and which is connected with the end of the bar or arm D by a pin which passes through a slot in the plate A. The plate B is held forward by a spring, F, attached to the plate A, and which rests against the edge of the bar or arm D, as shown in Fig. 2.

Having thus described my invention, I claim as new and desire to secure by Letters Patent—

As a new article of manufacture, a fastening for pocket-books, consisting of the plate A, slide B, provided with a serrated inner edge arm, D, knob E, and spring F, substantially as shown and described.

DANIEL M. READ.

Witnesses:
JAMES T. GRAHAM,
T. B. MOSHER.